United States Patent [19]

Schabert et al.

[11] 4,060,453
[45] Nov. 29, 1977

[54] NUCLEAR REACTOR INSTALLATION

[75] Inventors: Hans-Peter Schabert, Erlangen; Erwin Laurer, Mohrendorf, both of Germany

[73] Assignee: Kraftwerk Union Aktiengesellschaft, Mulheim (Ruhr), Germany

[21] Appl. No.: 679,078

[22] Filed: Apr. 21, 1976

[30] Foreign Application Priority Data

Apr. 30, 1975 Germany .............................. 2519376

[51] Int. Cl.$^2$ ................................................ G21C 9/00
[52] U.S. Cl. ................................... 176/38; 137/599.2; 176/87
[58] Field of Search .......................... 137/599.2, 637.2; 176/37, 38, 87

[56] References Cited

U.S. PATENT DOCUMENTS

| | | | |
|---|---|---|---|
| 3,081,919 | 3/1963 | Samuel | 137/599.2 |
| 3,529,630 | 9/1970 | Podolsky | 137/637.2 |
| 3,605,808 | 9/1971 | Fisler | 137/599.2 |
| 3,631,893 | 1/1972 | Seaman et al. | 137/630 |
| 3,734,134 | 5/1973 | Vogeli | 137/637.2 |

Primary Examiner—Samuel W. Engle
Assistant Examiner—Ralph Palo
Attorney, Agent, or Firm—Herbert L. Lerner

[57] ABSTRACT

In a nuclear reactor installation having a containment shell, a live steam line leading outwardly from the containment shell, a fast-acting shut-off valve connected in the steam line and having a flow cross section corresponding to the cross section of the steam line, the shut-off valve including a normally open main valve disk which is actuatable to close in response to pressure from a leak in the steam line, pressure dependent means associated with the main valve disk for sensing a pressure higher than operating pressure of the steam line, an opening mechanism includes a piston-actuated auxiliary valve disk disposed in a cut-out formed in the main valve disk and having an area equal at most to one-half the flow cross-sectional area of the shut-off valve, the auxiliary valve disk being operable by the pressure-dependent means to open the cut-out opening when a pressure higher than operating pressure of the steam line is sensed by the pressure dependent means.

16 Claims, 2 Drawing Figures

NUCLEAR REACTOR INSTALLATION

BACKGROUND OF THE INVENTION

1. Field of the Invention

The invention of the instant application relates to a nuclear reactor installation with a containment shell having a live steam line which leads to the outside and particularly to a fast-acting shut-off valve, with a pressure relief provision.

2. Description of the Prior Art

In a nuclear reactor described in copending application Ser. No. 590,672, filed June 26, 1975 and assigned to the same assignee as that of the instant application, wherein the nuclear reactor has a steam line with a shutoff valve, the valve corresponds to the cross section of the live steam line and includes a valve disk which is shut under the action of the pressure medium as a result of a leak in the live steam line. Shutting-off the live steam line prevents radioactivity from being released from the containment shell in the event of an accident. However, the pressure in the steam generating system can thereby be increased to excessive values since it is usually not possible to terminate the generation of steam as fast as the valve closes off the discharge cross section. Provision is therefore made for an opening mechanism associated with the valve disk which acts in dependence on pressure and opens at a pressure higher than the operating pressure of the live steam line but frees no more than half of the cross section. This provides a pressure relief which has the advantage of reducing the outflow rate when the valve operates as a safety valve. Secondary damage due to excessive outflow rates can thus be avoided. Such excessive rates, for example, as in a steam generator of a pressurized water reactor can stress the relatively thin walls of the tubes separating the reactor cooling water from the feed water to be evaporated and can lead to increased release of radioactivity in the event of a break. It is possible to obtain the desired smaller cross section by using a smaller opening stroke of the single valve disk of the valve. The drive of the valve disk must then be able to execute different movements. Although this can be achieved quite reliably with several different systems of operation, it is preferable to find a more simple drive mechanism.

SUMMARY OF THE INVENTION

It is therefore an object of the invention of the instant application to provide a pressure relief mechanism of relatively simplified construction which can operate by using a small cross section of a main shut off valve.

With the foregoing and other objects in view, there is provided in accordance with the invention, in a nuclear reactor installation having a containment shell, a live steam line leading outwardly from the containment shell, a fast-acting shut off valve connected in the steam line and having a flow cross section corresponding to the cross section of the steam line, the shut-off valve including a normally open main valve disk which is actuatable to close in response to pressure from a leak in the steam line, pressure dependent means associated with the main valve disk for sensing a pressure higher than operating pressure of the steam line, an opening mechanism comprising a piston-actuated auxiliary valve disk disposed in a cut-out formed in the main valve disk and having an area equal at most to one-half the flow cross-sectional area of the shut-off valve, the auxiliary valve disk being operable by the pressure dependent means to open the cut-out opening when a pressure higher than operating pressure of the steam line is sensed by the pressure dependent means.

In accordance with another feature of the invention, a first piston is connected to the main valve disk and a second piston to the auxiliary valve disk, the second piston being displaceably disposed within a cylinder formed of a first cylindrical portion of the first piston. In this way, proper coordination of the simultaneous displacements of the main and auxiliary valve disks during the complete opening of the fast-acting shut-off valve is positively effected. In this case, the auxiliary valve disk can execute a movement by itself requiring a simple drive mechanism. Similarly, the main valve disk has only a simple displacement stroke which entrains the auxiliary valve disk in the direction of the opening of the valve.

In accordance with a further feature of the invention, pressure relief means are included for controlling the operation of the first and second pistons. Thus, the valve-opening displacement is effected by pressure relief with the aid of control valves because such actuations are especially desirable from the standpoint of safety engineering.

In accordance with an added feature of the invention, the first piston has two oppositely acting piston surfaces of different size, so that both the opening of the auxiliary valve disk as well as the closing thereof can be effected in dependence upon the pressure, especially pressure relief.

In accordance with yet another feature of the invention, the first piston is disposed within a second cylindrical portion of the fastacting shut-off valve, the second cylindrical portion forming the larger of the two piston surfaces, a third smaller cylindrical portion forming the smaller of the piston surfaces on the opposite side of the first piston, and a plurality of passages or bores is provided through the shut-off valve connecting the first, second and third cylindrical portions with the steam line.

In accordance with an additional feature of the invention, the bores or passages are formed with throttling sections. The throttling action advantageously depends upon the cross sections selected for the pressure relief, excessive escape of steam through the relief lines being prevented through the throttling action. Furthermore, the passages or bores are disposed in such a manner that they simultaneously afford run-off of condensate that can form in the interior of the valve.

In accordance with a concomitant feature of the invention, the first and second pistons include respective rods extending outwardly from the shut-off valve for indicating the positions of the main valve disk and auxiliary valve disk. The rods may be disposed coaxially so that the position thereof can be monitored, for example magnetically, at one location.

In accordance with still another feature of the invention, the first piston includes a first outlet valve, the second piston, in an end position thereof, closing the first outlet valve.

In accordance with a still further feature of the invention, the shut-off valve includes a second outlet valve, the first piston in an end position thereof, closing second outlet valve.

In accordance with another added feature of the invention, the first and second pistons include bosses closing the first and second outlet valves, respectively.

In accordance with a further added feature of the invention, the second outlet valve includes two annular coaxial projections on an inner face having an annular space therebetween and forming the inlet of the second outlet valve.

In accordance with a still further added feature of the invention, resilient means are included on the first piston engageable with one of the projections for closing the second outlet valve.

In accordance with yet another added feature of the invention, the resilient means is a cup spring.

In accordance with yet a further feature of the invention, the contact pressure of the resilient means engaging the projection is increasable by the steam pressure.

In accordance with still another feature of the invention, spring means are provided for biasing the auxiliary valve disk toward the normally closed position thereof.

In accordance with still a further feature of the invention, the relative sizes of the piston surfaces are such that the closing force of the first piston is less than one-half of the opening force of the main valve disk, the closing force of the second piston is less than one-half the opening force of the auxiliary valve disk, the closing forces of the first and second pistons are larger than twice the forces acting to close the first and second outlet valves, and the outer diameters of the piston surfaces acting to close the outlet valves are larger than the diameter of the valve openings closed by the main and auxiliary valve disks.

Other features which are considered as characteristic for the invention are set forth in the appended claims.

Although the invention is illustrated and described herein as embodied in a nuclear reactor installation, it is nevertheless not intended to be limited to the details shown, since various modifications may be made therein without departing from the spirit of the invention and within the scope and range of equivalents of the claims.

The invention, however, together with additional objects and advantages thereof will be best understood from the following description when read in conjunction with the accompanying drawings.

DESCRIPTION OF THE PREFERRED EMBODIMENTS

Figure 1:
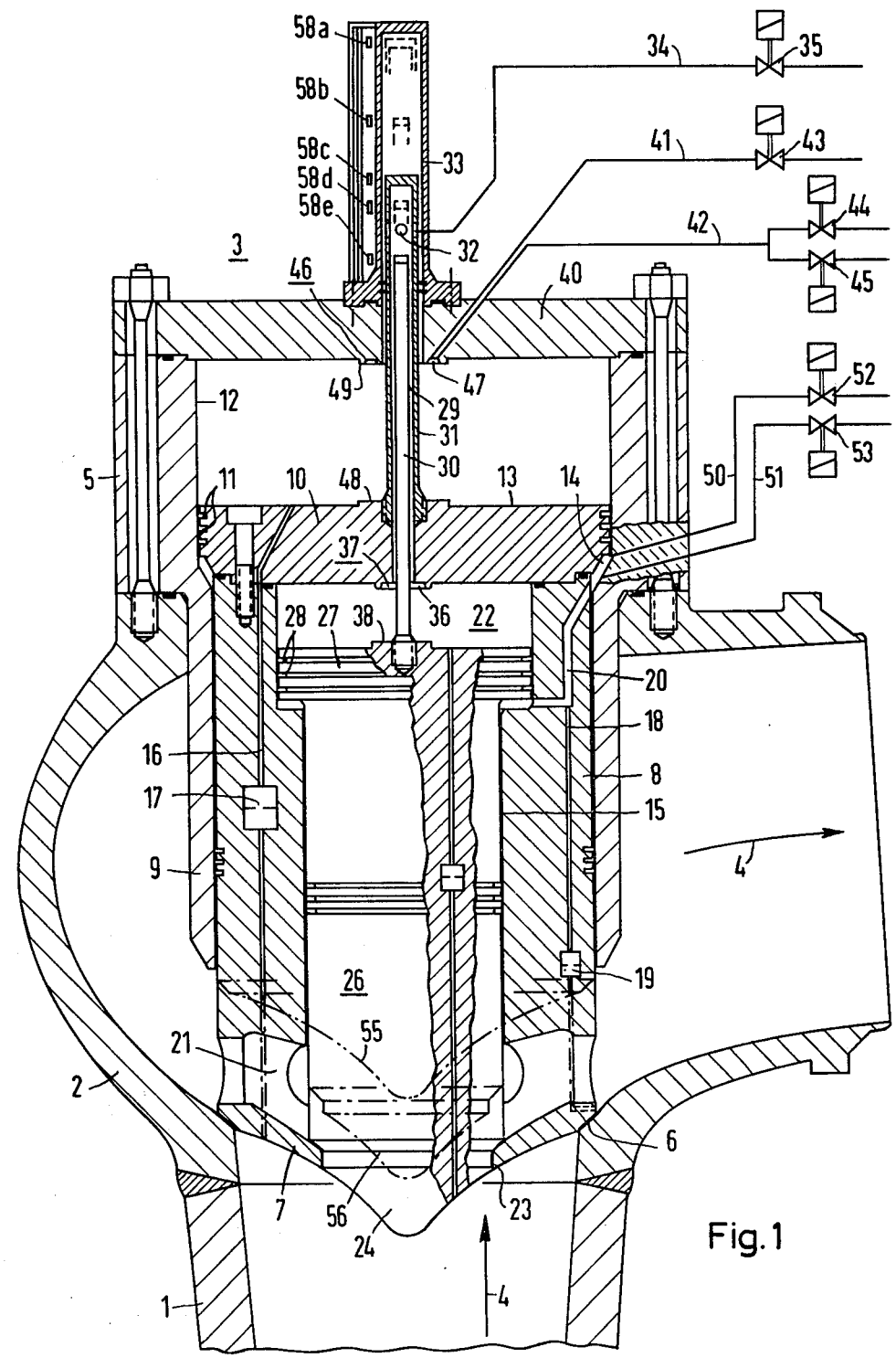
FIG. 1 is a partial cross-sectional view of the fast acting shutoff valve of the instant invention as included in a steam line of a nuclear reactor installation, with external controls being shown schematically.

FIG. 1 shows a picture of a nuclear reactor installation incorporating the invention. For the sake of clarity, the figure shows only the live steam line 1 which comes from the steam generator of a pressurized water reactor and which forms a right-angle elbow in the indicated area. The housing 2 of the fast-acting shut-off valve 3 is structurally combined with this elbow. The arrows 4 indicate the direction of flow of the steam.

A valve seat 6 is provided in the housing 2, on which a main valve head or disk 7 is seated in the closed position. The valve disk 7 has an extended tubular shaft 8 which is sealed and slides within a sleeve 9, the upper part 5 of which is screwed to the valve housing 2. Attached at the upper end of the shaft 8 is a piston 10 which slides with piston rings 11 in a cylinder 12 in the upper part 5. The piston 10 is a differential piston having a larger piston surface 13, effective in the closing direction of the valve disk 7, opposed by a smaller piston surface 14, which can be acted upon in the opening direction of the main valve disk 7.

In addition to a central cavity 15 inside shaft 8, bore holes 16 are provided which are equipped with throttling locations 17. A further bore hole 18 with a throttling location 19 leads from the outgoing live steam line to a channel 20. The latter connects the space of the smaller piston surface 14 with an enlarged section 22 of the inner cavity 15.

The central cavity 15 forms a cutout in the valve disk 7, the edge or rim 23 of which cooperates as a valve seat with an auxiliary valve disk 24. In the illustrated embodiment, the auxiliary valve disk 24 has half the diameter of the valve disk 7 and therefore, one-quarter of its cross-sectional area. In the closed position shown, the auxiliary valve disk 24 shuts off the passage to an enlarged opening or cutout 21 in the valve disk 7, which communicates through the illustrated holes with the part of the live steam line 1 located behind the valve seat 6.

The auxiliary valve disk 24 is guided by a shaft 26 sealed in the shaft 8 of the main valve disk 7. The end of the shaft 26 facing away from the valve seat is formed as a piston 27 which slides with piston rings 28 in the enlarged cylinder 22. The cylinder 22, through an annular space 29 located between an indicator rod 30 of the auxiliary valve disk 24 and a sleeve 31 surrounding the rod 30 and secured to the piston 10, communicates with an outlet opening 32, which leads into a wider sleeve 33. Connected to the opening 32 in the sleeve 33 is a line 34 in which a magnetic valve 35 is positioned. The inlet 36 of the intermediate space 29 can be closed off by a boss 38, as an outlet valve 37, when the piston 27 is raised to occupy the upper end position thereof.

Two lines 41 and 42 are connected at the upper end of the cylinder 12, which is closed by a cover 40. The lines lead to valves 43, 44 and 45, which can likewise be operated magnetically. However, the inlet 47 of the lines is closed off by a boss 48 on piston 10, which, in the raised position at the upper end thereof, rests on projections 49 of the cover 40 to form an outlet valve 46.

The part of the cylinder 12 which lies below the piston 10 and is associated with the smaller piston surface 14, is vented through two lines 50 and 51 when the control valves 52 and 53 located therein, are operated. The valves 52 and 53 lead directly into the non-illustrated containment shell of the nuclear reactor installation while the valves 35, 43, 44 and 45 are connected with a blowdown tank, also not shown, which is located in the containment shell.

The fast-acting shut-off valve 3 which is shown in solid lines in the lower closed position, is normally completely open in the raised position. At the same time, the auxiliary valve disk 24 and the valve disk 7, are both in the raised position which provides a contour 55 having desirable flow characteristics i.e. stream-lining, shown by the alternating single dash-double dot lines, for the passage of the steam through the valve housing 2. Pressure is thus applied to the cylinder 12 and the cylinder 14, as well as to the two parts of the cylinder 22. The area closed off by the outlet valve 46 within the projections 49 provides holding pressure which is relieved by the opening of one of the valves 43, 44 or 45.

If an accident should occur, the valve 52 or 53 opens to empty the cylinder 14, and close the fast-acting shut-off valve 3. Due to the relief of pressure, the valve disk 7, together with the valve disk 24 move down into the closed postion shown.

If, after the closing, the pressure in the live steam line 1 rises excessively, the valve disk 24 can be raised independently by opening valve 35 and venting the cylinder 22. This opens a path through the valve disk 7, through the valve seat 23 and the cutout 21. With the main valve disk 7 closed, the auxiliary valve disk 24 then assumes the raised postion shown in dot-dash lines at 56. The outlet valve 37 then closes the venting line 34. The relief opening, having about one-quarter of the free blow-through cross section of the fast-acting shut-off valve 3, thus providing pressure relief without secondary damage.

The respective position of the valve disks 7 and 24 can be ascertained magnetically by means of the rod 30 and sleeve 31 connected therewith. For this purpose, magnetically actuated contacts, such as reed contacts 58a and 58e, are provided outside the sleeve 33, which sense the respective upper and lower end position of the sleeve 31 and the rod 30 and transmit them electrically.

Figure 2:
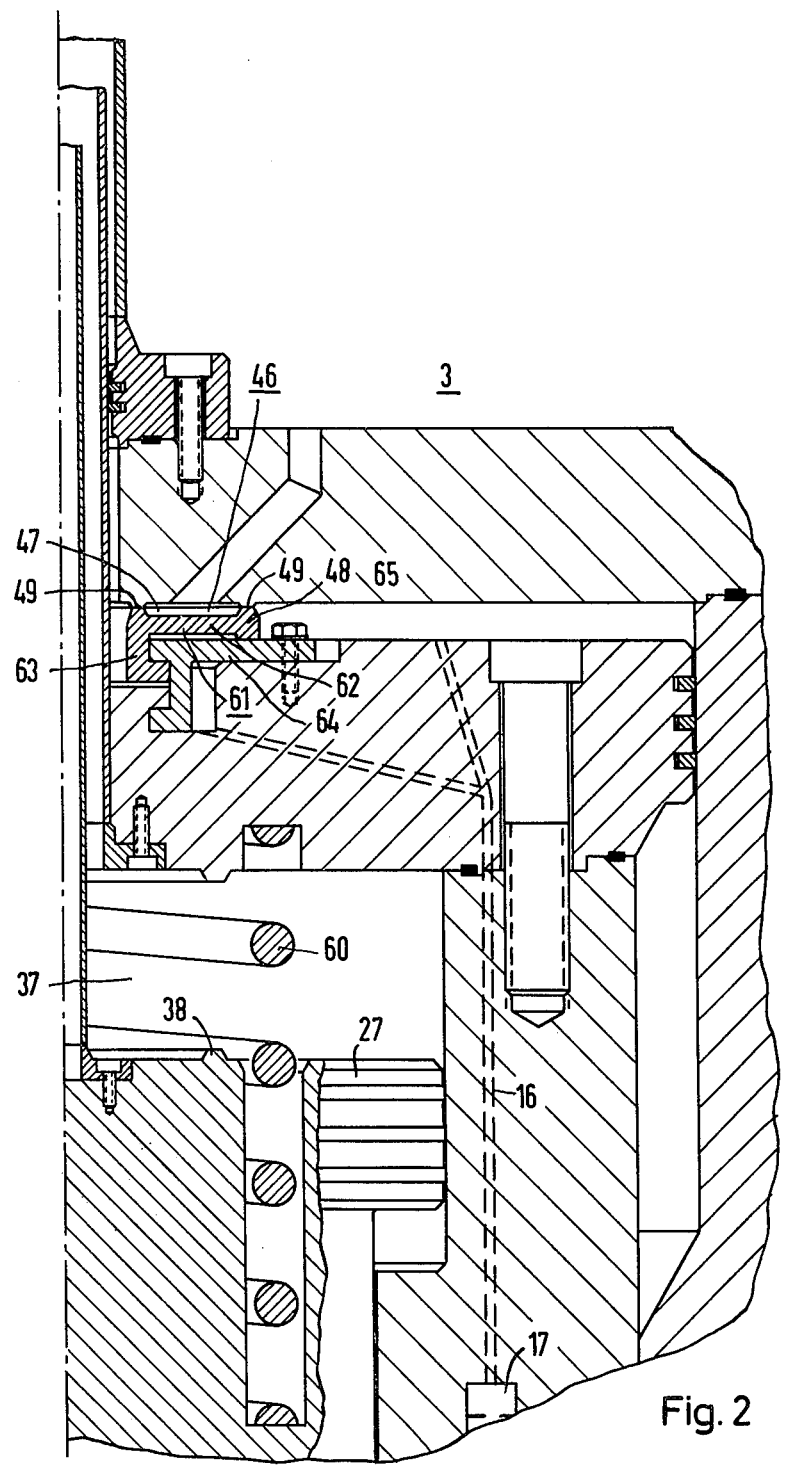
FIG. 2 is another partial cross-sectional view of an upper portion of the fast acting shut-off valve showing additional features in further detail.

FIG. 2 shows only the upper part of the valve 3, with the same reference symbols being used for like parts as those of FIG. 1.

In the case the piston 27 for the auxiliary valve disk 24 is subjected to the action of a closing spring 60 which prevents the auxiliary valve disk from fluttering. The closing force in the closed position may, for example, be one megapond (Mp) or 1000 kg. The piston is shown in raised position.

The outlet valve 46 includes a projecting member 48 which closes off an annular space 47 located between two side projections 49. The member 48 is in the form of a cup spring 61 with the substantially I-shaped configuration visible in the figure. One leg 62 of the I-shaped member forms the closing area and the other leg 63 is used to secure the spring by means of a split ring 64, which is attached with screws 65.

The cup spring 61 is constructed so that, in the unloaded condition, the leg 62 is inclined at an angle with respect to a line perpendicular to the axis of the valve motion. As a result, during the closing movement, contact first occurs at one of the projections 49, which is preferably the inner one. As the cup spring 61 is resilient, a tight seat is ensured at the two concentric sealing surfaces 49, which can also withstand the steam conditions in the live steam line of a nuclear power station, which, for example, may be a steam pressure of 80 bar or more at temperatures of about 300° C.

Regardless of the specific construction of the outlet valve 46, the piston surfaces and the sealing surfaces of the fast-acting shut-off valve 3 should have a definite relationship to one another to provide good sealing as well as reliable operation. The closing force of the main piston 10, with, for example 105 Mp should be more than one-half of the opening force of, for example, 400 Mp, acting on the main valve disk 7. The closing force of the auxiliary piston 27 with, for example, 65 Mp, should be no more than one-half of the opening force of, for example, 145,000 kg, acting on the auxiliary valve disk 24. In addition, the closing forces of the main and auxiliary pistons 10 and 27, which may be 70 and 50 Mp, respectively, should be at least twice as large for actuation as the back-sealing forces, which may be 30 and 20 Mp, respectively, produced at the outlet valves 37 and 46.

It is also advantageous if the closing forces increase with decreasing counterpressure. This can be realized by providing that the diameter determined by the piston rings is larger above the valve seat than the mean diameter of the valve seat.

As a guidepost for a preferred embodiment, some typical dimensions are indicated as follows:

| Main Valve Disk 7: | |
|---|---|
| mean sealing seat diameter | 65 cm |
| diameter of the piston rings in the shaft 8 | 68.5 cm |
| diameter of the piston rings 11 at the piston 10 | 75.3 cm |
| diameter of the projections 49 | 9 and 22 cm, respectively |
| Auxiliary Valve Disk 24: | |
| mean sealing seat diameter | 34 cm |
| diameter of the piston rings 28 at the piston 27 | 45.5 cm |
| diameter of the outlet valve 37 | 17 cm |

There are claimed:

1. In a nuclear reactor installation having a containment shell, a live steam line leading outwardly from the containment shell, a fast-acting shut-off valve connected in the steam line and having a flow cross section corresponding to the cross section of the steam line, the shut-off valve including a normally open main valve disk which is actuatable to close in response to pressure from a leak in the steam line, pressure dependent means associated with the main valve disk for sensing a pressure higher than operating pressure of the steam line, an opening mechanism comprising a piston-actuated auxiliary valve disk disposed in a cut-out formed in the main valve disk and having an area equal at most to one-half the flow cross-sectional area of the shut-off valve, said auxiliary valve disk being operable by said pressure-dependent means to open said cut-out opening when a pressure higher than operating pressure of the steam line is sensed by said pressure dependent means.

2. The nuclear reactor installation of claim 1 including a first piston connected to said main valve disk and a second piston connected to said auxiliary valve disk, said second piston being displaceably disposed within a cylinder formed of a first cylindrical portion of said first piston.

3. The nuclear reactor installation of claim 2 including pressure-relief means for controlling the operation of said first and second pistons.

4. The nuclear reactor installation of claim 3 wherein said first piston has two oppositely acting piston surfaces of different size.

5. In a nuclear reactor installation having a containment shell, a live steam line leading outwardly from the containment shell, a fast-acting shut-off valve connected in the steam line and having a flow cross section corresponding to the cross section of the steam line, the shut-off valve including a normally open main valve disk which is actuatable to close in response to pressure from a leak in the steam line, pressure dependent means associated with the main valve disk for sensing a pressure higher than operating pressure of the steam line, an opening mechanism comprising a piston-actuated auxiliary valve disk disposed in a cut-out formed in the main valve disk and having an area equal at most to one-half the flow cross-sectional area of the shut-off valve, said auxiliary valve disk being operable by said pressure-dependent means to open said cut-out opening when a pressure higher than operating pressure of the steam line is sensed by said pressure dependent means, a first piston connected to said main valve disk and a second piston connected to said auxiliary valve disk, said second piston being displaceably disposed within a cylinder formed of a first cylindrical portion of said first piston, pressure-relief means for controlling the operation of said first and second piston, said first piston having two oppositely acting piston surfaces of different size, said first piston being disposed within a second cylindrical portion of said fast acting shut-off valve, the second cylindrical portion forming the larger of the two piston surfaces, a third smaller cylindrical portion forming the smaller of the piston surfaces on the opposite side of said first piston, and including a plurality of passages through said shut-off valve connecting said first, second and third cylindrical portions with said steam line.

6. The nuclear reactor installation of claim 5 wherein said passages include throttling sections.

7. The nuclear reactor installation of claim 5 wherein said first and second piston include respective elongated members extending outwardly from said shut-off valve for indicating the positions of said main valve disk and auxiliary valve disk.

8. The nuclear reactor installation of claim 5 wherein said first piston includes a first outlet valve, said second piston, in an end position thereof, closing said first outlet valve.

9. The nuclear reactor installation of claim 8 wherein said shut-off valve includes a second outlet valve, said first piston, in an end position thereof, closing said second outlet valve.

10. The nuclear reactor installation of claim 9 wherein said first and second pistons include bosses closing said first and second outlet valves, respectively.

11. The nuclear reactor installation of claim 9 wherein said second outlet valve includes two annular coaxial projections on an inner face having an annular space therebetween and forming the inlet of said second outlet valve.

12. The nuclear reactor installation of claim 11 including resilient means on said first piston engageable with one of said projections for closing said second outlet valve.

13. The nuclear reactor installation of claim 12 wherein said resilient means is a cup spring.

14. The nuclear reactor installation of claim 12 wherein contact pressure of said resilient means engaging said projection is increasable by the steam pressure.

15. The nuclear reactor installation of claim 2 including spring means for biasing said auxiliary valve disk toward said normally closed position thereof.

16. The nuclear reactor installation of claim 9 wherein the relative sizes of the piston surfaces are such that the closing force of said first piston is less than one-half the opening force of said main valve disk, the closing force of said second piston is less than one-half the opening force of said auxiliary valve disk, the closing forces of said first and second pistons are larger than twice the forces acting to close said first and second outlet valves, and the outer diameters of the piston surfaces acting to close said outlet valves are larger than the diameters of the valve openings closed by said main and auxiliary valve disks.

* * * * *